United States Patent
Chang

(10) Patent No.: US 7,458,714 B2
(45) Date of Patent: Dec. 2, 2008

(54) OPTICAL PLATE AND BACKLIGHT MODULE USING THE SAME

(75) Inventor: Shao-Han Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/842,170

(22) Filed: Aug. 21, 2007

(65) Prior Publication Data

US 2008/0266873 A1 Oct. 30, 2008

(30) Foreign Application Priority Data

Apr. 30, 2007 (CN) .................. 2007 1 0200583

(51) Int. Cl.
*F21V 8/00* (2006.01)
(52) U.S. Cl. .................. 362/626; 362/620; 362/333; 362/339; 362/309; 362/612; 362/244
(58) Field of Classification Search .......... 362/626, 362/625, 623, 617, 619, 620, 326, 330, 333, 362/339, 308, 309, 311, 612, 613, 244, 245, 362/246, 249, 558, 560
See application file for complete search history.

(56) References Cited

U.S. PATENT DOCUMENTS

| | | | | |
|---|---|---|---|---|
| 5,249,104 A | * | 9/1993 | Mizobe | 362/605 |
| 2002/0097578 A1 | * | 7/2002 | Greiner | 362/240 |
| 2006/0013002 A1 | * | 1/2006 | Coushaine et al. | 362/308 |
| 2007/0086179 A1 | * | 4/2007 | Chen et a. | 362/27 |
| 2007/0147073 A1 | * | 6/2007 | Sakai et al. | 362/607 |

* cited by examiner

*Primary Examiner*—Laura Tso
(74) *Attorney, Agent, or Firm*—Frank R. Niranjan

(57) ABSTRACT

An exemplary optical plate includes at least one transparent plate unit. The transparent plate unit includes a light output surface, a bottom surface, a plurality of microstructures and at least a lamp-receiving portion. The bottom surface is opposite to the light output surface. The microstructures are formed on the light output surface and the bottom surface respectively. Each microstructure includes at least three side surfaces connected with each other, a transverse width of each side surface decreasing along a direction away from the base surface of the microstructure. The lamp-receiving portion is defined in the bottom surface. A backlight module using the present optical plate is also provided.

18 Claims, 8 Drawing Sheets

OPTICAL PLATE AND BACKLIGHT MODULE USING THE SAME

CROSS-REFERENCE TO RELATED APPLICATIONS

This application is related to seven copending U.S. patent applications, which are: application Ser. No. 11/835,425, filed on Aug. 8, 2007, and entitled "OPTICAL PLATE AND BACKLIGHT MODULE USING THE SAME"; application Ser. No. 11/835,426, filed on Aug. 8, 2007, and entitled "OPTICAL PLATE AND BACKLIGHT MODULE USING THE SAME"; application Ser. No. 11/835,427, filed on Aug. 8, 2007, and entitled "OPTICAL PLATE AND BACKLIGHT MODULE USING THE SAME"; application Ser. No. 11/835,428, filed on Aug. 8, 2007, and entitled "OPTICAL PLATE AND BACKLIGHT MODULE USING THE SAME"; application Ser. No. 11/835,429, filed on Aug. 8, 2007, and entitled "OPTICAL PLATE AND BACKLIGHT MODULE USING THE SAME"; application Ser. No. 11/835,430, filed on Aug. 8, 2007, and entitled "OPTICAL PLATE AND BACKLIGHT MODULE USING THE SAME"; application Ser. No. 11/835,431, filed on Aug. 8, 2007, and entitled "OPTICAL PLATE AND BACKLIGHT MODULE USING THE SAME". In all these copending applications, the inventor is Shao-Han Chang. All of the copending applications have the same assignee as the present application. The disclosures of the above identified applications are incorporated herein by reference.

BACKGROUND OF THE INVENTION

1. Field of the Invention

The present invention relates to an optical plate for use in, for example, a backlight module, the backlight module typically being employed in a liquid crystal display (LCD).

2. Discussion of the Related Art

In a liquid crystal display device, liquid crystal is a substance that does not itself generate light. Instead, the liquid crystal relies on light received from a light source, in order for the liquid crystal to display data images. In the case of a typical liquid crystal display device, a backlight module powered by electricity supplies the needed light.

FIG. 8 represents a typical direct type backlight module 100. The backlight module 100 includes a housing 101, a light reflective plate 102, a light diffusion plate 103, a prism sheet 104, and a plurality of light emitting diode 105 (hereinafter called LED). The housing 101 includes a rectangular base 1011 and four sidewalls 1013 extending from a periphery of the base 1011. The base 1011 and the four sidewalls 1013 cooperatively define a chamber 107. Each LED 105 includes a base portion 1053 and a light-emitting portion 1051 disposed on the base portion 1053. The LEDs 105 are electrically connected to a printed circuit board (not labeled), and the printed circuit board is fixed to the base 1011 of the housing 101. The light reflective plate 102 is disposed on the LEDs 105 in the chamber 107. The light reflective plate 102 defines a plurality of through holes (not labeled) that allows the light-emitting portions 1051 of the LEDs 105 to pass through and to emit light to be transmitted to the light diffusion plate 103. The light diffusion plate 103 and the prism sheet 104 are stacked in that order on the chamber 107. Light emitted from the LEDs 105 is substantially reflected by the light reflective plate 102 to enter the light diffusion plate 103, and diffused uniformly in the light diffusion plate 103, and finally surface light is output from the prism sheet 104.

Generally, a plurality of dark areas may occur because of the reduced intensity of light between adjacent LEDs 105. In the backlight module 100, each LED 105 further includes a reflective sheet 106 disposed on the top of the light-emitting portion 1051, configured for decreasing the brightness of a portion of the backlight module 100 above the LED 105. However, the brightness of the backlight module 100 is still not uniform. One method of enhancing the uniformity of brightness of the backlight module 100 is to increase the space between the light diffusion plate 103 and the LEDs 105. This increase in space tends to eliminate dark areas. However, increasing the space between the diffusion plate 103 and the LEDs 105 will also increase the thickness of the backlight module 100 and further the overall intensity of the output light is reduced.

What is needed, therefore, is a new optical plate and a backlight module using the optical plate that can overcome the above-mentioned shortcomings.

SUMMARY

An optical plate according to a preferred embodiment includes at least one transparent plate unit. The transparent plate unit includes a light output surface, a bottom surface, a plurality of microstructures, and at least a lamp-receiving portion. The bottom surface is opposite to the light output surface. The microstructures are formed on the light output surface and the bottom surface respectively. Each microstructure includes at least three side surfaces connected with each other, a transverse width of each side surface decreasing along a direction away from the base surface of the microstructure. The lamp-receiving portion is defined in the bottom surface.

A backlight module according to a preferred embodiment includes a housing, a side-lighting type point light source, an optical plate, and a light diffusion plate. The housing includes a base and a plurality of sidewalls extending around a periphery of the base, the base and the sidewalls cooperatively forming an opening. The point light source is disposed on the base, each point light source having a light-emitting portion. The same optical plate as described in the previous paragraph is employed in this embodiment. The light-emitting portion of the point light source is inserted in the lamp-receiving portion of the optical plate correspondingly. The light diffusion plate is disposed on the housing over the opening.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module using the optical plate. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present optical plate and backlight module, in detail.

Figure 1:
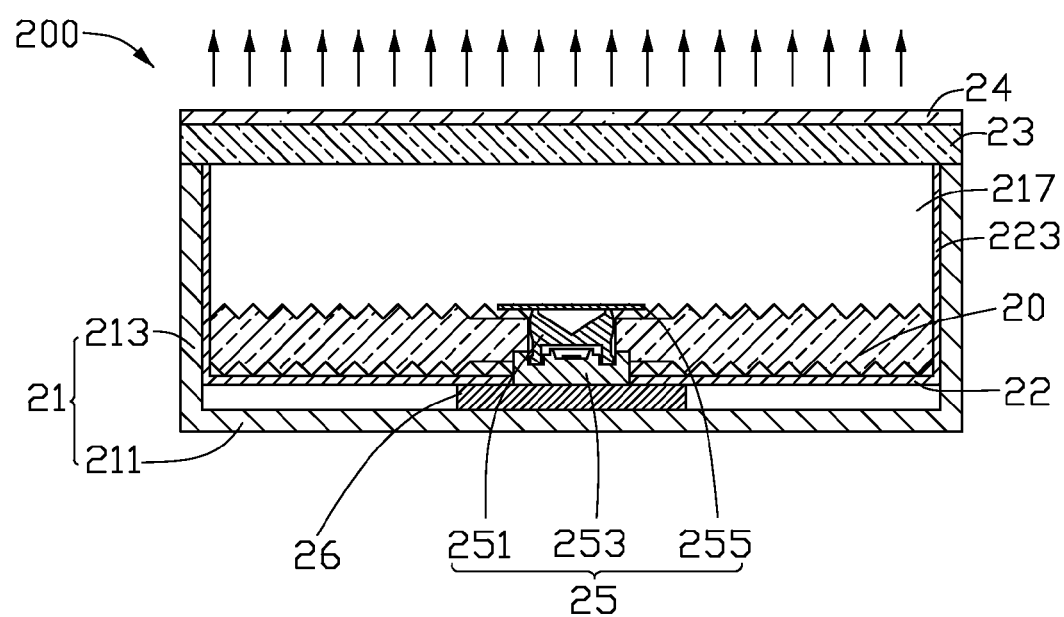
FIG. 1 is a side cross-sectional view of a backlight module using an optical plate according to a first preferred embodiment of the present invention.

Referring to FIG. 1, a backlight module 200 in accordance with a first preferred embodiment is shown. The backlight module 200 includes a housing 21, a light reflective plate 22, a light diffusion plate 23, a side-lighting type LED 25, and an optical plate 20. The housing 21 includes a rectangular base 211 and four sidewalls 213 extending around a periphery of the base 211 correspondingly. The base 211 and the sidewalls 213 cooperatively form an opening 217. The optical plate 20, the light reflective plate 22 and the LED 25 are received in the housing 21. The light diffusion plate 23 is disposed on the housing 21 over the opening 217.

Figure 2:
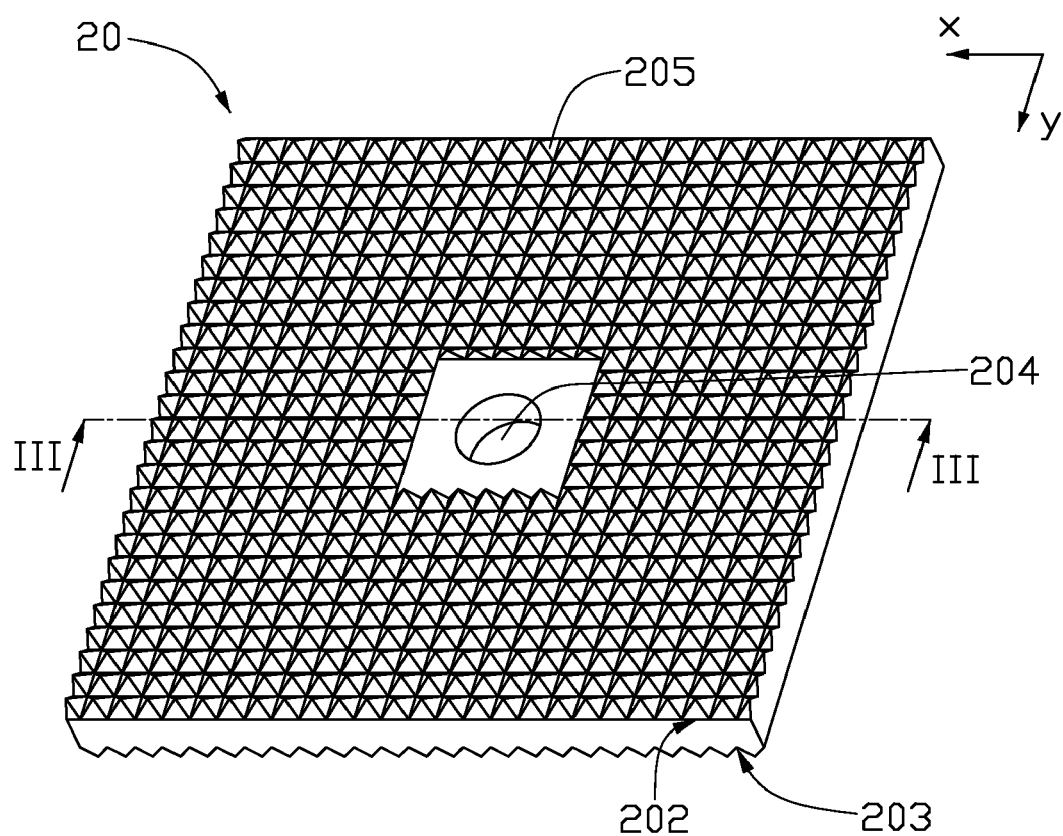
FIG. 2 is an isometric view of the optical plate of FIG. 1.
Figure 3:
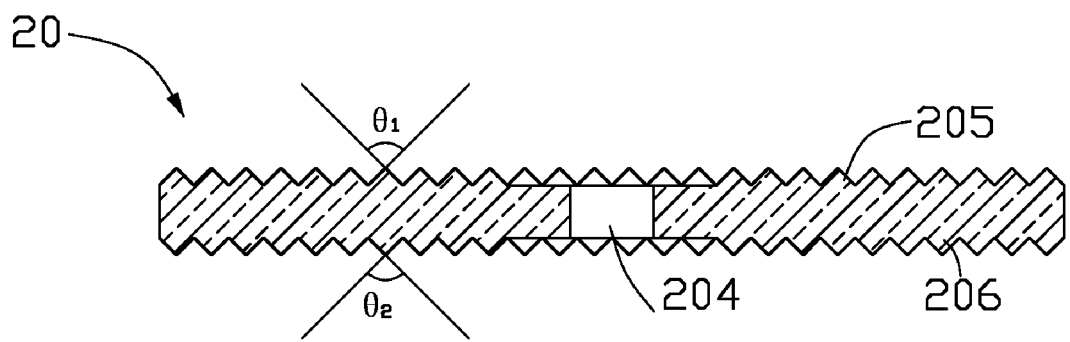
FIG. 3 is a side cross-sectional view taken along line III-III of FIG. 2.

Referring to FIGS. 2 and 3, the optical plate 20 is substantially a transparent rectangular plate that can be mounted into the housing 21. The optical plate 20 includes a light output surface 202 and a bottom surface 203 on another side of the optical plate opposite to the light output surface 202. A plurality of microstructures 205 are formed on the light output surface 202. A plurality of microstructures 206 are formed on the bottom surface 203. The optical plate 20 further includes a lamp-receiving portion 204 defined in a center of the bottom surface 203. In this embodiment, the lamp-receiving portion 204 is a through hole communicating between the light output surface 202 with the bottom surface 203. The optical plate 20 can be made from material selected from the group consisting of polycarbonate (PC), polymethyl methacrylate (PMMA), polystyrene (PS), copolymer of methylmethacrylate and styrene (MS), and any suitable combination thereof.

The microstructures 205, 206 are distributed in a matrix manner. The rows and columns of the microstructures 205, 206 in the matrix are parallel to the edges of the optical plate (along the X-axis and Y-axis direction), respectively. Each microstructure 205, 206 includes four side surfaces (not labeled) connected with each other. A transverse width of each side surface of microstructure 205, 206 decreases along a direction away from the base surface of the microstructure 205, 206. A pitch between adjacent microstructures 205, 206 along an X-axis direction or a Y-axis direction is configured to be in a range from about 0.025 millimeters to about 2 millimeters. Referring to FIG. 3, an dihedral angle $\theta_1$, $\theta_2$ defined by two opposite side surfaces of each of the microstructures 205, 206 is configured to be in a range from about 60 degrees to about 120 degrees.

Also referring to FIG. 1, in this embodiment, the side-lighting type LED 25 includes a base portion 253, a light-emitting portion 251 disposed on the base portion 253, and a reflective member 255 disposed on the top of the light-emitting portion 251. The LED 25 is electrically connected to a printed circuit board 26 that is fixed to the base 211 of the housing 21. The light-emitting portion 251 of the LED 25 is inserted into the lamp-receiving portion 204 of the optical plate 20, and the light output surface 202 of the optical plate 20 faces the light diffusion plate 23. The light reflective plate 22 defines a through hole (not labeled). The light reflective plate 22 is disposed underneath the bottom surface 203 of the optical plate 20 with the LED 25 passing through the light reflective plate 22 via the through hole.

In use, light emitted from the light-emitting portion 251 of the LED 25 enters the optical plate 20 via an inner surface of the lamp-receiving portion 204. A significant amount of light travels through the optical plate 20. Since the side surfaces of the microstructures 205 are slanted, incident light that may have been internally reflected on a flat surface is reflected at the side surfaces of the microstructures 205. As a result, a great amount of light can exit from the light output surface 202.

In addition, the microstructures 205 can condense and collimate light exiting the optical plate 20, thereby improving the brightness of light illumination. Furthermore, since the side-lighting type LED 25 is positioned in the lamp-receiving portion 204, light exits from the light output surface 202 uniformly, except that the portion above the LED 25 has relatively low illumination. Light exiting the optical plate 20 can be further substantially mixed in a chamber between the optical plate 20 and the light diffusion plate 23, and finally uniform surface light is outputted from the light diffusion plate 23. A distance from the LED 25 to the light diffusion plate 23 may be configured to be very small, with little or no risk of dark areas on the portion of the backlight module 200 directly above the LED 25 being created. Accordingly, the backlight module 200 can have a thin configuration while still providing good, uniform optical performance.

It should be pointed out that, the light reflective plate 22 can be omitted. In an alternative embodiment, a high reflectivity film can be deposited on inner surface of the base 211 and the sidewalls 213 of the housing 21. In other alternative embodiments, the housing 21 is made of metal materials, and has high reflectivity inner surfaces.

It is to be understood that, in order to improve brightness of the backlight module 200 within a specific viewing range, the backlight module 200 can further include a prism sheet 24 disposed on the light diffusion plate 23. In addition, in order to improve light energy utilization rate of the backlight module 200, the light reflective plate 22 can further include four reflective sidewalls 223 extending around a periphery thereof and contacting with the corresponding sidewalls 213 of the housing 21. Furthermore, the rows or columns of the microstructures 205 and 206 may not be parallel to the respective edges of the optical plate but have other alignments or orientations.

Figure 4:
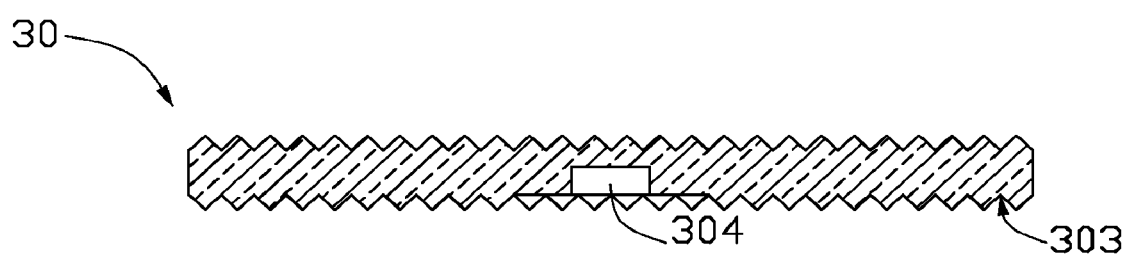
FIG. 4 is a side cross-sectional view of an optical plate according to a second preferred embodiment of the present invention.

Referring to FIG. 4, an optical plate 30 in accordance with a second preferred embodiment is shown. The optical plate 30 is similar in principle to the optical plate 20 of the first embodiment, however, the lamp-receiving portion 304 of the optical plate 30 is a blind hole. It should be pointed out that, a side-lighting type LED (not shown) without a reflective member can be mounted into the lamp-receiving portion 304 of the optical plate 30 to form a backlight module. Alternatively, a reflective member of the LED can be also positioned on a center of the optical plate 30 above the lamp-receiving portion 304.

Figure 5:
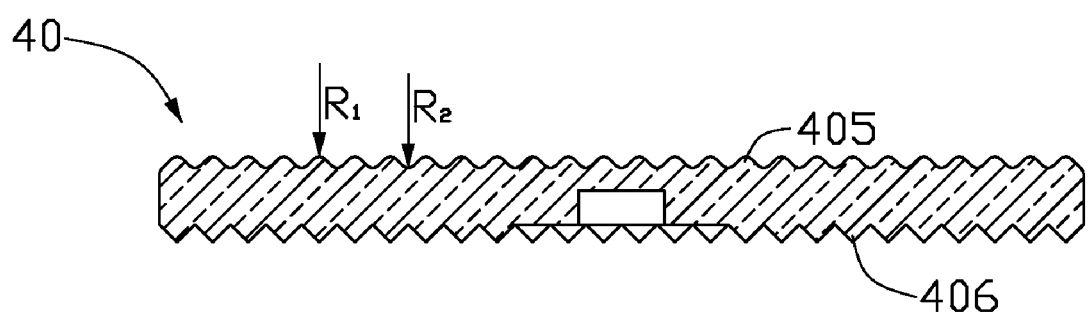
FIG. 5 is a side cross-sectional view of an optical plate according to a third preferred embodiment of the present invention.

Referring to FIG. 5, an optical plate 40 in accordance with a third preferred embodiment is shown. The optical plate 40 is similar in principle to the optical plate 30, except that either dihedral angles defined by two opposite side surfaces of each microstructure 405 of the optical plate 40 or base angles defined by two adjacent microstructures 405 of the optical plate 40 are rounded to form first arc angles $R_1$ and second arc angles $R_2$ respectively. It is to be understood that, one or more of the dihedral angles defined by two opposite side surfaces of each microstructure 406 and the base angles defined by two adjacent microstructures 406, can also be rounded.

Figure 6:
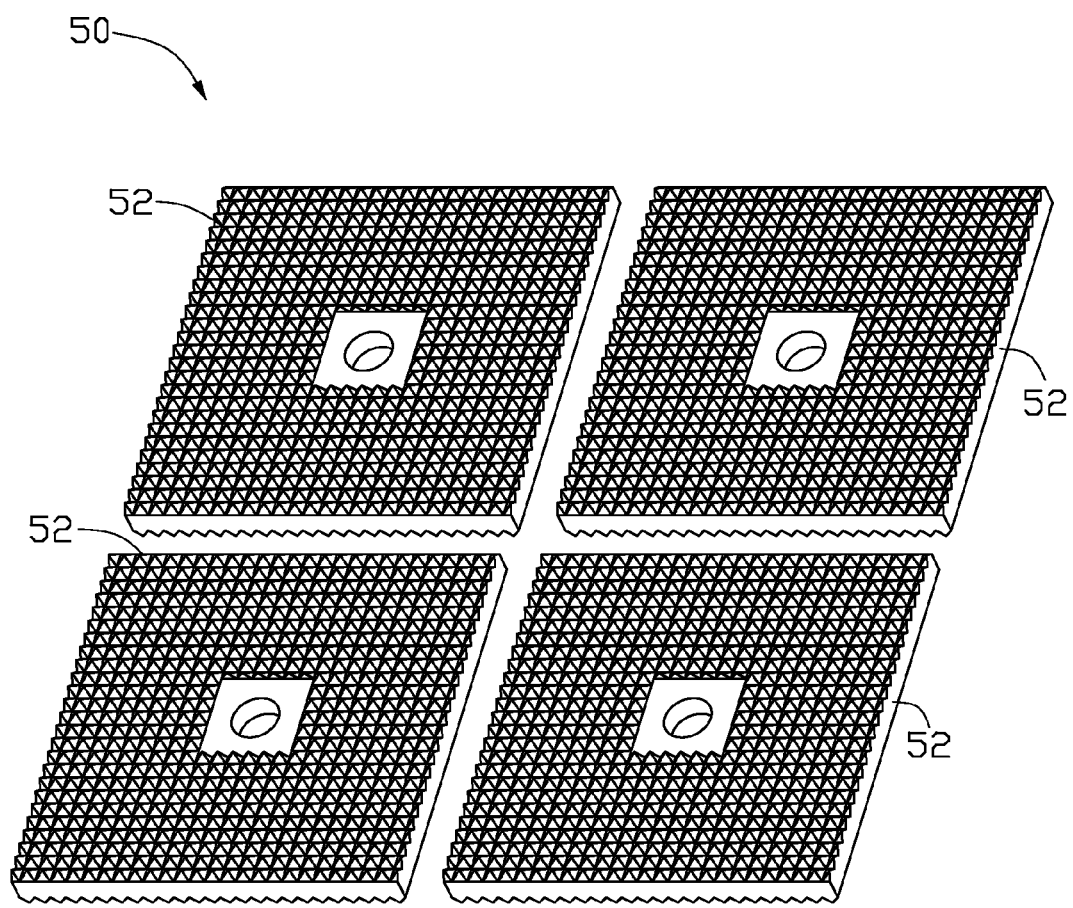
FIG. 6 is an exploded, isometric view of an optical plate according to a fourth preferred embodiment of the present invention.

Referring to FIG. 6, a combined optical plate 50 in accordance with a fourth preferred embodiment is shown. The optical plate 50 includes four transparent plate units 52. Each transparent plate unit 52 is the same as the optical plate 20 of the first embodiment. The four transparent plate units 52 are tightly arranged side by side to form the assembled optical plate 50. It is to be understood that four side-lighting type LEDs and the assembled optical plate 50 can be mounted into a housing to form a larger size backlight module.

Figure 7:
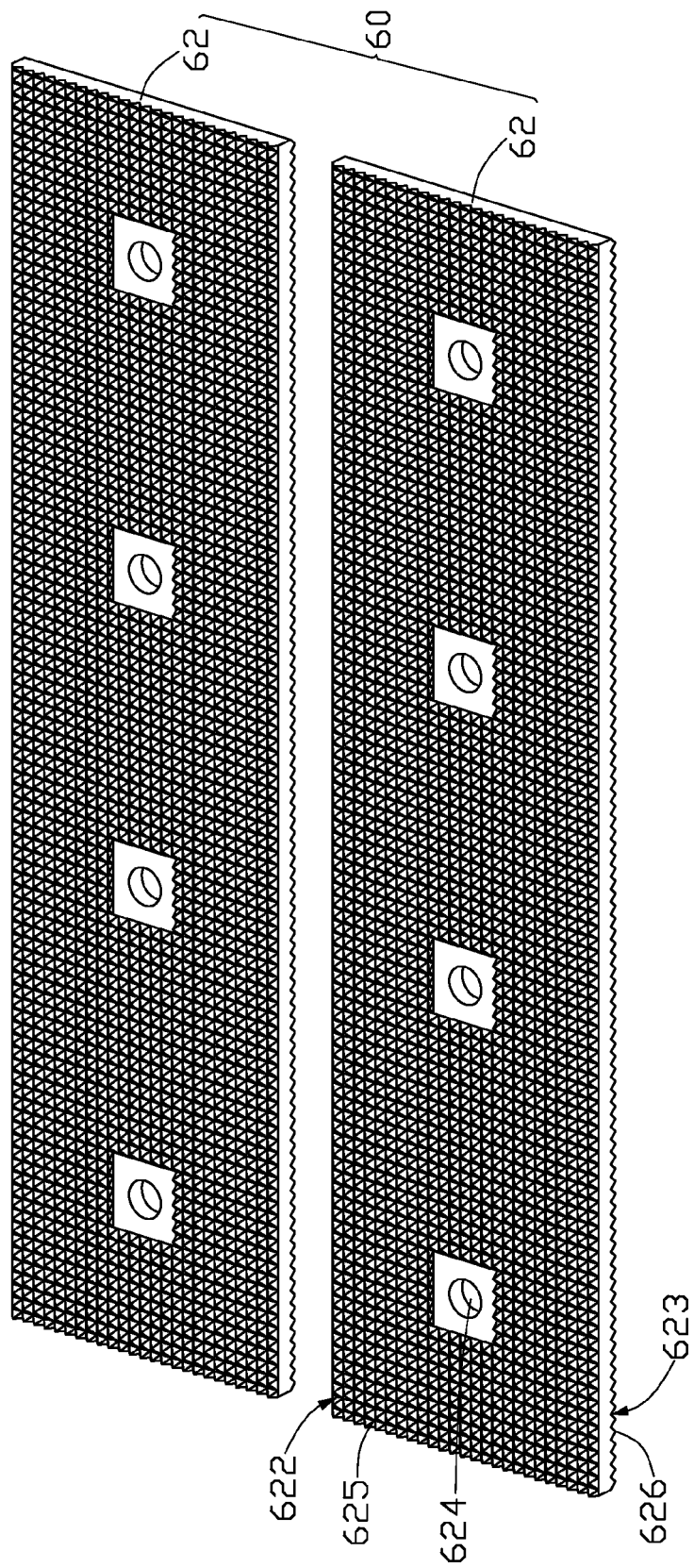
FIG. 7 is an exploded, isometric view of an optical plate according to a fifth preferred embodiment of the present invention.
Figure 8:
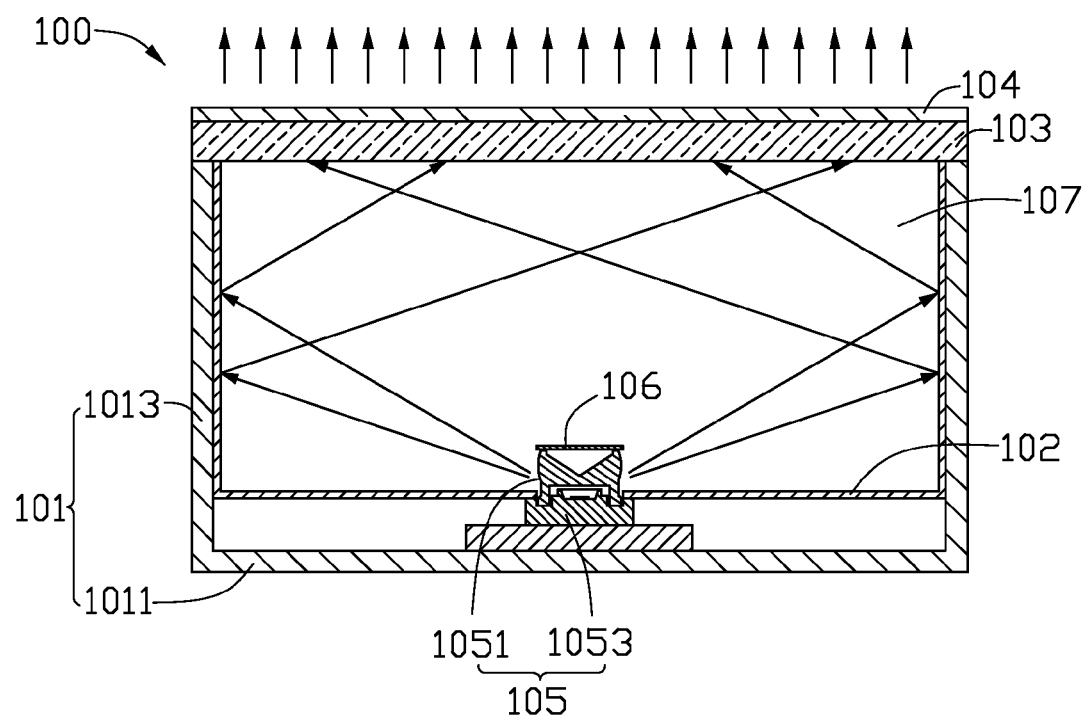
FIG. 8 is a side cross-sectional view of a conventional backlight module.

Referring to FIG. 7, another assembled optical plate 60 in accordance with a fifth preferred embodiment is shown. The assembled optical plate 60 includes two transparent plate units 62 that can be combined together. Each transparent plate unit 62 is similar in principle to the optical plate 20, however, the transparent plate unit 62 is an elongated rectangular plate, and four lamp-receiving portions 624 are defined apart in each transparent plate unit 62. Either microstructures 625 formed on light output surface 622 or microstructures 626 formed on bottom surface 623, are similar as those of the optical plate 20. In use, a plurality of side-lighting type LEDs and the assembled optical plate 60 can be mounted into a housing to form a larger size backlight module.

It is noted that the scope of the present optical plate is not limited to the above-described embodiments. In particular, even though specific shape of microstructures (pyramidal protrusions) 205, 206, 405, 406, 625, 626 have been described and illustrated, the microstructures (pyramidal protrusions) 205, 206, 405, 406, 625, 626 can have various other suitable shapes. For example, the microstructures can be three-sided (triangular) pyramidal protrusions, five-sided (pentagonal) pyramidal protrusions, multi-sided (polygonal) pyramidal protrusions, or frustums of these.

In a backlight module using the assembled optical plates of the fourth and fifth embodiments, a plurality of red, green, and blue colored LEDs can be inserted into the lamp-receiving portions of the assembled optical plates, such that a mixed white surface light can be obtained. It is to be understood that other kinds of point light source, such as field emission lamps and so on, can replace the LEDs 25 in above embodiments.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical plate comprising:
    at least one transparent plate unit having:
    a light output surface;
    a bottom surface opposite to the light output surface;
    a plurality of microstructures formed on the light output surface and the bottom surface respectively, wherein each microstructure comprises at least three side surfaces connected with each other, a transverse width of each side surface decreasing along a direction away from the base surface of the microstructure; and
    at least a lamp-receiving portion defined in the bottom surface.

2. The optical plate according to claim 1, wherein the microstructures are selected from a group consisting of triangular pyramidal protrusions, rectangular pyramidal protrusions, pentagonal pyramidal protrusions, polygonal pyramidal protrusions, and frustums of these.

3. The optical plate according to claim 2, wherein the microstructures are rectangular pyramidal protrusions, a dihedral angle defined by two opposite side surfaces of each of the microstructures is configured to be in a range from about 60 degrees to about 120 degrees.

4. The optical plate according to claim 2, wherein the microstructures are rectangular pyramidal protrusions, one or more of dihedral angles defined by two opposite side surfaces of each microstructure and base angles defined by two adjacent microstructures, are rounded.

5. The optical plate according to claim 2, wherein the microstructures are rectangular pyramidal protrusions, a pitch between adjacent microstructures in a same plane is configured to be in a range from about 0.025 millimeters to about 2 millimeters.

6. The optical plate according to claim 1, wherein the microstructures are distributed on the light output surface and the bottom surface in a matrix manner, rows and columns of the microstructures in the matrix are parallel to or slanted to edges of the optical plate.

7. The optical plate according to claim 1, wherein the lamp-receiving portion is selected from one of blind hole and through hole communicating between the bottom surface with the light output surface.

8. The optical plate according to claim 1, wherein the optical plate includes a plurality of the transparent plate units, the transparent plate units being tightly combined with each other.

9. A backlight module comprising:
    a housing having a base and a plurality of sidewalls extending around a periphery of the base, the base and the sidewalls cooperatively forming an opening;
    at least one side-lighting type point light source disposed on the base, each point light source having a light-emitting portion;
    an optical plate positioned in the housing, the optical plate including at least one transparent plate unit having:
    a light output surface;
    a bottom surface opposite to the light output surface;
    a plurality of microstructures formed on the light output surface and the bottom surface respectively, wherein each microstructure comprises at least three side surfaces connected with each other, a transverse width of each side surface decreasing along a direction away from the base surface of the microstructure; and at least a lamp-receiving portion defined in the bottom surface, wherein the light-emitting portion of the at least one point light source is inserted in the lamp-receiving portion correspondingly; and
    a light diffusion plate disposed on the housing over the opening.

10. The backlight module according to claim 9, further comprising a light reflective plate defining a through hole therein, the light reflective plate being disposed underneath the bottom surface of the optical plate, and the point light source passing through the light reflective plate via the through hole.

11. The backlight module according to claim 10, wherein the light reflective plate further comprises a plurality of reflective sidewalls extending from a periphery thereof and contacting with the sidewalls of the housing.

12. The backlight module according to claim 9, wherein the housing is made of metal materials, and has high reflectivity inner surfaces.

13. The backlight module according to claim 9, further comprising a high reflectivity film deposited on inner surface of the base and the sidewalls of the housing.

14. The backlight module according to claim 9, further comprising a prism sheet disposed on the light diffusion plate.

15. The backlight module according to claim 9, wherein the microstructures are selected from a group consisting of triangular pyramidal protrusions, rectangular pyramidal protrusions, pentagonal pyramidal protrusions, polygonal pyramidal protrusions, and frustums of these.

16. The backlight module according to claim 15, wherein the microstructures are rectangular pyramidal protrusions, one or more of dihedral angles defined by two opposite side surfaces of each microstructure and base angles defined by two adjacent microstructures, are rounded.

17. The backlight module according to claim 9, wherein the microstructures are distributed on the light output surface and the bottom surface in a matrix manner, rows and columns of the microstructures in the matrix are parallel to or slanted to edges of the optical plate.

18. The backlight module according to claim 9, wherein the lamp-receiving portion is selected from one of blind hole and through hole communicating between the bottom surface with the light output surface.

* * * * *